United States Patent Office 2,955,482
Patented Oct. 11, 1960

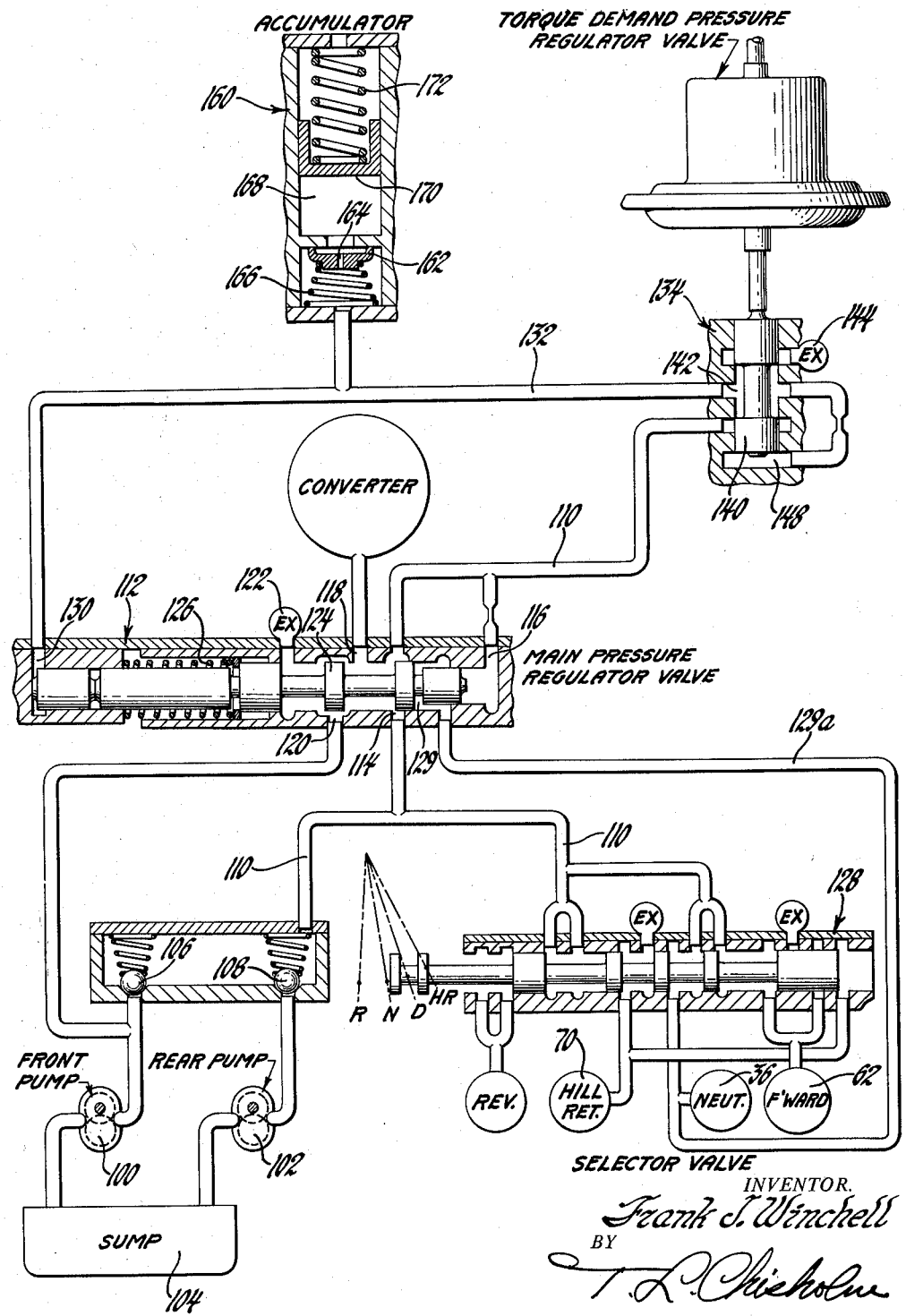

2,955,482

TRANSMISSION

Frank J. Winchell, Bloomfield Hills, Mich., assignor to General Motors Corporation, Detroit, Mich., a corporation of Delaware Original application July 25, 1956, Ser. No. 600,022. Divided and this application Sept. 16, 1957, Ser. No. 684,196

5 Claims. (Cl. 74—472)

This application is a division of my application jointly with Oliver K. Kelley, Serial Number 600,022, filed July 25, 1956.

The parent application discloses a transmission, particularly adapted to driving automobiles, this transmission having friction torque-establishing devices including clutches and reaction brakes for establishing drive from the usual engine to the customary propeller shaft. It also discloses hydraulic control systems for such torque establishing devices.

The invention covered by this divisional application relates to the control system, and its objects include particularly the provision of an improved and simplified control system which maintains the control pressure in accord with the torque or load demand on the system. In particular it is an object of this invention to vary the control pressure with torque demand, but to delay the reduction of control pressure when torque demand drops, and to increase control pressure quickly when torque demand increases.

These and other objects will be apparent in the following description and in the accompanying drawing, which shows a schematic control diagram for the transmission.

In general, this control system includes any suitable source of control fluid under pressure, a manually operable selector valve for selecting forward, neutral, and reverse; and an automatic valve for regulating the pressure of the control system in accordance with torque demand on the engine.

The source of pressure includes a front pump 100 driven by the usual automobile engine and a rear pump 102 driven by the transmission output shaft. The pumps take in oil from a sump 104 and deliver it at high pressure through the check valves 106 and 108, respectively, to a main line 110. The pressure in the main line is regulated by any suitable pressure regulator valve generally designated by 112 having an inlet port 114, a pressure regulating chamber 116 connected to the main line, a converter feed port 118, a front pump selector port 120 and an exhaust port 122 which is connected to the sump. These ports are controlled by a valve stem generally designated 124 constantly urged to the right, as Fig. 3 is seen, by a spring 126.

The main line 110 supplies oil at the regulated pressure as determined by spring 126 and chamber 116 in the known manner to a manual valve 128 which selectively directs oil under pressure to the pressure chambers for operating the various clutches and brakes previously referred to. The drawings show the valve stem in the position for forward drive so that oil is supplied to a neutral clutch chamber 36 and to a forward clutch chamber 62, all other operating chambers being connected to an exhaust port.

The value of the pressure maintained by the regulator valve 112 may be changed as desired for different operating conditions of the transmission. For example, suppose the regulating valve as so far described is designed to maintain a predetermined pressure for holding a hill brake actuated by the chamber 70. A lower pressure than this will hold the neutral clutch and the forward and reverse clutches. Therefore, whenever the neutral clutch is applied, which will be either in normal forward or reverse drive, the pressure in the main line 110 is reduced by a pressure chamber 129 acting on the stem 124 of the regulator valve in which chamber main line pressure is maintained by a conduit 129a leading from the neutral clutch chamber 36. Pressure in the chamber 129 opposes the force of the spring 126 and thus reduces the pressure which will be maintained by the valve 112, as is known.

The line pressure can be regulated in accordance with torque demand on the engine by any suitable means which maintains a pressure which is a measure of torque demand and supplies this torque-demand pressure to a modulating control chamber 130 at the left end of the regulator valve. This assists spring 126 by being connected through conduit 132 to a pressure modulating valve, generally designated by 134, which maintains in the line 132 a pressure measured by the torque demand on the engine. The result is that when the torque demand is high, the pressure in the main line 110 is high, while when torque demand is low, line pressure is reduced.

The modulator valve 134 may be of any suitable known construction. For example, a valve stem 140 either admits oil under main line pressure from main line 110 to a modulated pressure chamber 142 or vents chamber 142 through an exhaust port 144. The valve stem is urged down or toward open position to increase the pressure in line 110 by a spring and is urged up or toward closed and vented position to reduce pressure in the line 110 by the force of the modulated pressure conducted from chamber 142 to a modulating chamber 148. The spring is opposed by a diaphragm exposed on its lower side to atmospheric pressure and on its upper side to the pressure of the intake manifold of the engine of the car connected to a closed chamber, one side of which is formed by the diaphragm. This is one known form of device for maintaining in the modulated pressure chamber 142 and in the modulating chamber 130 of the main pressure regulating valve, a pressure measured by the torque demand on the engine.

It is desirable to have line pressure increase quickly when engine torque is about to increase, and to have it decrease slowly when engine torque is about to drop. To this end, the modulating conduit 132 which changes the pressure maintained by the regulator valve 112 is connected to an accumulator generally designated 160 through a check valve 162 having a small orifice 164 and normally closed by a spring 166. If the throttle is opened suddenly, indicating that the torque is to be increased, the pressure in the line 132 tends to increase and because the check valve 162 is closed, pressure builds up quickly in chamber 130 to increase pressure in main line 110 quickly. After the pressure has thus increased, oil continues to flow slowly through the orifice 164 filling a cylinder 168 by displacing a piston 170 against a spring 172. Thereafter, when the throttle is suddenly closed, indicating that the torque of the engine is about to decrease it is desired to have the pressure in the system remain at a high value for a short period to enable the clutches to hold tight until the engine slows down and the torque is actually reduced. When this occurs the valve stem 140 may suddenly open the exhaust port 144 but oil in the accumulator cylinder 168 will then flow out rapidly through the check valve 162 opened by the pressure of the cylinder as determined by the spring 166 and this will delay reduction of pressure in the modulating conduit 132 and hence in the main line 110.

I claim:

1. The combination of a power transmission adapted to drive a load shaft from an engine, a source of fluid pressure, fluid-pressure-operated means for establishing a driving connection between the transmission and the load shaft, means for normally continuously regulating the pressure of the source in response to the torque demand on the engine including a second source of pressure which maintains a pressure which is a function of torque demand; and means for controlling rate of change of pressure of the source including an elastic reservoir connected to the second source and direction-responsive flow control means between the reservoir and the second source for enforcing slow flow into the reservoir and permitting fast flow from the reservoir.

2. The combination of a power transmission adapted to drive a load shaft from an engine, a source of fluid pressure, fluid pressure operated means for establishing a driving connection between the transmission and the load shaft, means for normally continuously regulating the pressure of the source in response to the torque demand on the engine including a conduit and pressure control means for maintaining fluid in the conduit under a pressure which is a function of torque demand; and means for controlling rate of change of pressure of the source including an elastic reservoir connected to the conduit and direction-responsive flow control means between the reservoir and the pressure control means including a constantly open passage of relatively small cross section permitting slow flow between the pressure control means and the reservoir, a normally closed passage of relatively large cross section between the pressure control means and the reservoir, and means responsive to a lower pressure in the conduit than in the reservoir for opening the large passage to permit rapid flow between the reservoir and the conduit.

3. The combination of a power transmission adapted to drive a load shaft from an engine; a source of fluid pressure; fluid pressure-operated means for establishing a driving connection between the transmission and the load shaft; means for normally continuously regulating the pressure of the source in response to the torque demand on the engine including a pressure-responsive relief valve connected to the source; pressure-responsive means for opposing opening of the relief valve; means for continuously supplying to said pressure-responsive means fluid under a pressure which is a function of the torque demand; an elastic reservoir constantly connected to the pressure-responsive means by a restricted passage which enforces slow flow between the reservoir and the pressure-responsive means; an unrestricted passage which permits fast flow between the reservoir and the pressure-responsive means; means normally closing the unrestricted passage; and means for opening the unrestricted passage in response to a predetermined excess of pressure in the reservoir over the pressure in the pressure-responsive means.

4. The combination of a power transmission adapted to drive a load shaft from an engine, a source of fluid pressure, fluid pressure operated means for establishing a driving connection between the transmission and the load shaft, means for normally continuously regulating the pressure of the source in response to the torque demand on the engine including a conduit and pressure control means for maintaining fluid in the conduit under a pressure which is a function of torque demand; and means for controlling rate of change of pressure of the source including an elastic reservoir connected to the conduit and direction-responsive flow control means between the reservoir and the pressure control means including a constantly open passage of relatively small cross section requiring slow flow from the pressure control means to the reservoir, a normally closed passage of relatively large cross section between the reservoir and the pressure control means, and means responsive to a lower pressure in the conduit than in the reservoir for opening the large passage to permit rapid flow between the reservoir and the conduit.

5. The combination of a power transmission adapted to drive a load shaft from an engine; a source of fluid pressure; fluid pressure-operated means for establishing a driving connection between the transmission and the load shaft; means for normally continuously regulating the pressure of the source in response to the torque demand on the engine including a pressure-responsive relief valve connected to the source; pressure-responsive means for opposing opening of the relief valve; means for continuously supplying to said pressure-responsive means fluid under a pressure which is a function of the torque demand; an elastic reservoir constantly connected to the pressure-responsive means by a restricted passage between the reservoir and the means for maintaining pressure which is a function of torque demand, which passage enforces slow flow into the reservoir; an unrestricted passage which permits fast flow from the reservoir; means normally closing the unrestricted passage; and means for opening the unrestricted passage in response to a predetermined excess of pressure in the reservoir over the pressure in the pressure-responsive means.

References Cited in the file of this patent

UNITED STATES PATENTS

| | | |
|---|---|---|
| 2,663,393 | Livermore | Dec. 22, 1953 |
| 2,695,696 | Iavelli | Nov. 30, 1954 |
| 2,815,684 | Roche | Dec. 10, 1957 |
| 2,875,643 | Kelley | Mar. 3, 1959 |